United States Patent [19]
Chang

[11] Patent Number: 5,349,445
[45] Date of Patent: Sep. 20, 1994

[54] MECHANICAL TRANSMISSION MECHANISM FOR FAX MACHINE

[75] Inventor: Hong-Yu Chang, Cheng I-Lan Hsien, Taiwan

[73] Assignee: Cal-Compelectronics, Inc., Taipei, Taiwan

[21] Appl. No.: 770,213

[22] Filed: Oct. 3, 1991

[51] Int. Cl.⁵ .......................... H04N 1/23; H04N 1/32
[52] U.S. Cl. ...................... 358/296; 358/438
[58] Field of Search ............. 358/296, 400, 434, 438; 400/120; 346/76 PH

[56] References Cited
U.S. PATENT DOCUMENTS
5,249,062 9/1993 Ejiri et al. ........................ 358/296

Primary Examiner—Benjamin R. Fuller
Assistant Examiner—Eric Frahm
Attorney, Agent, or Firm—Jacobson, Price, Holman & Stern

[57] ABSTRACT

A fax machine provided with an optical reader, a roller, a heat sensitive head for printing, a heat sensitive head press piece, a roller transmission mechanism, a heat sensitive head sustaining mechanism, and a steering clutch mechanism. As the fax machine receives a transmitting signal, the sustaining mechanism urges upwardly the heat sensitive head so that there is a substantial clearance between the heat sensitive head and the roller to ensure that the heat sensitive paper (the fax paper) is not rolled out when transmitting graphic information. As soon as the fax machine has received a reproducing or receiving signal, the steering clutch mechanism directly actuates the roller transmission mechanism so as to initiate the operation of reproducing or receiving graphic information while the heat sensitive head is not urged upwardly.

15 Claims, 7 Drawing Sheets

MECHANICAL TRANSMISSION MECHANISM FOR FAX MACHINE

BACKGROUND OF THE INVENTION

The present invention relates to an improved transmission mechanism of a fax machine, and more particularly to an improved one-roller type transmission mechanism replacing a two-roller type transmission mechanism used in the conventional fax machine of the prior art.

Figure 1:
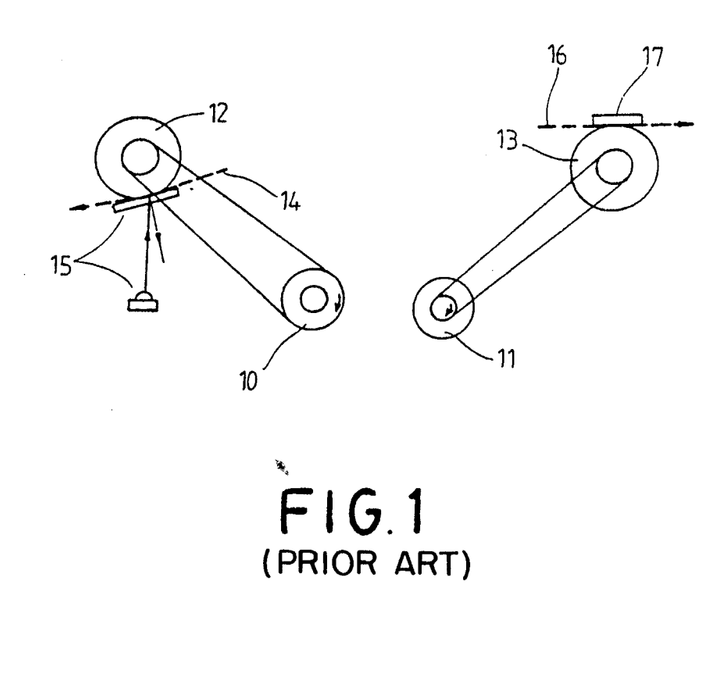
FIG. 1 shows a schematic diagram of a transmission mechanism and a receiving mechanism of a conventional fax machine of the prior art.
Figure 2:
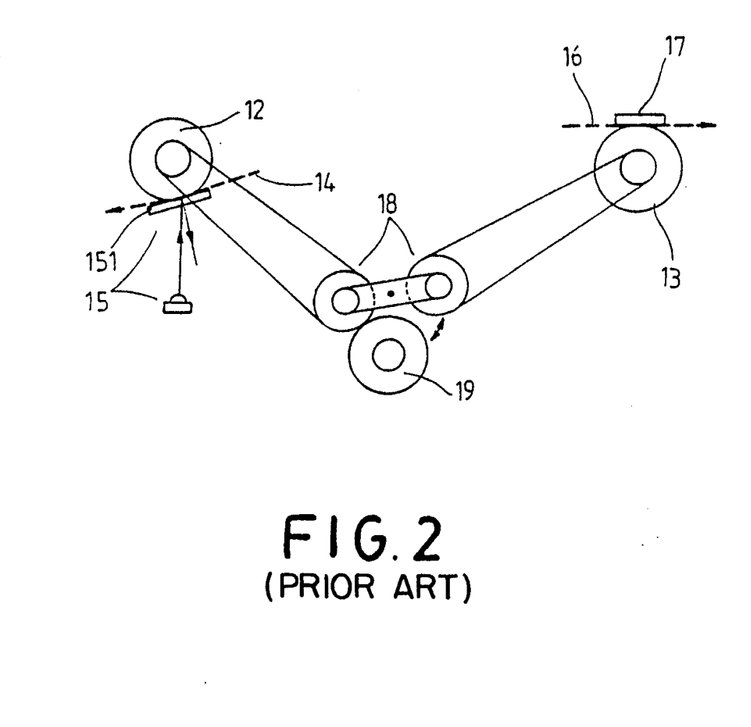
FIG. 2 shows a schematic diagram of a transmission mechanism and a receiving mechanism of another conventional fax machine of the prior art.

A fax machine is capable of transmitting, receiving, and reproducing graphic matter. As shown in FIG. 1, a mechanical design of the early model of a fax machine includes two motors 10 and 11 for actuating two rollers 12 and 13 respectively. The projective reading of graphic information 14 by an optical reader 15 is driven by motor 10 and roller 12 when the fax machine is executing a transmission and reproduction of graphic information 14. Motor 11 and roller 13 are responsible for driving the heat sensitive paper 16 (the fax paper) to make contact with the printing lead 17 to print out graphic information which the fax machine has received as an incoming message. In other words, such transmission mechanism includes an information-reading portion 10, 12, and 15 and an information-reproducing portion 11, 13, and 17. These two portions are completely separated by design in order to prevent them from interfering with each other when the fax machine receives an operation signal initiating the internal control system to instruct one of the transmitting or receiving mechanisms to operate. In view of current industrial trends to add versatility to products and to miniaturize products, fax machines are nowadays made with the inclusion of an electronic device, such as memory, to broaden its peripheral application. As a result, the design of the transmission mechanisms of a fax machine, in which the reading mechanism and the reproducing mechanism are separately set up, has evolved into a more ingenious system, in which only one motor is used to actuate two rollers, as shown in FIG. 2. Such a design includes a clutch device 18, which is used to actuate rollers 12 and 13 upon receiving an operation signal. It is apparent that such a transmission mechanism with only one motor 19 is more efficient in terms of cost control and energy consumption.

This inventor is of the opinion that the information reading mechanism can be set up in combination with time information reproducing mechanism because both mechanisms make use of the rollers 12 and 13 to roll out, respectively, the graphic information paper 14 and heat sensitive paper (the fax paper) 16. However, in the process of transmitting graphic information by the fax machine, heat sensitive paper 16 must not be rolled out, and graphic information paper 14 can be easily actuated and driven by a slight force exerted upon the graphic information paper 14 located between the roller 12 and the clear view window 151, as shown in FIG. 2. On the other hand, the information reproducing mechanism is dependent on the roller 13 and the printing head 17 each of which must exert a substantial force on the heat sensitive paper 16 so as to ensure that the heat sensitive paper 16 makes good contact with the printing head 17 in order to reproduce a good copy of incoming graphic information that the fax machine has received. If we want to design a fax machine having only one roller to do all the jobs instead of two rollers 12 and 13 as described above, we must find, first of all, a way to prevent the heat sensitive paper 16 from being rolled out at a time when the process of transmitting graphic information is in progress.

SUMMARY OF THE INVENTION

It is therefore the primary objective of the present invention to provide a fax machine with an innovative structural design capable of transmitting, receiving and reproducing graphic information by means of one roller.

Such a structural design includes a sustaining means for a heat sensitive head, which is capable of preventing heat sensitive head from making contact with the roller during the process of transmitting graphic information by a fax machine. Furthermore, such a design also serves to minimize a compression force existing between a heat sensitive head and a roller so as to prevent the heat sensitive paper from being rolled out during the process of transmitting graphic information by the fax machine. On the other hand, the heat sensitive paper is allowed to roll out by means of rotating action of the roller in the absence of working of the sustaining means at the time when the fax machine is receiving and reproducing graphic information.

Such an innovative design of the present invention enables a fax machine to do all its jobs by means of one roller which is an expensive component. Therefore, the present invention simplifies the structural design of a fax machine and succeeds in substantially reducing the cost of making a fax machine.

The foregoing features, objectives, and advantages of the present invention can be better understood by studying the following detailed description of the preferred embodiment, in conjunction with the drawings provided herein.

DETAILED DESCRIPTION OF THE PREFERRED EMBODIMENT

Figure 3:
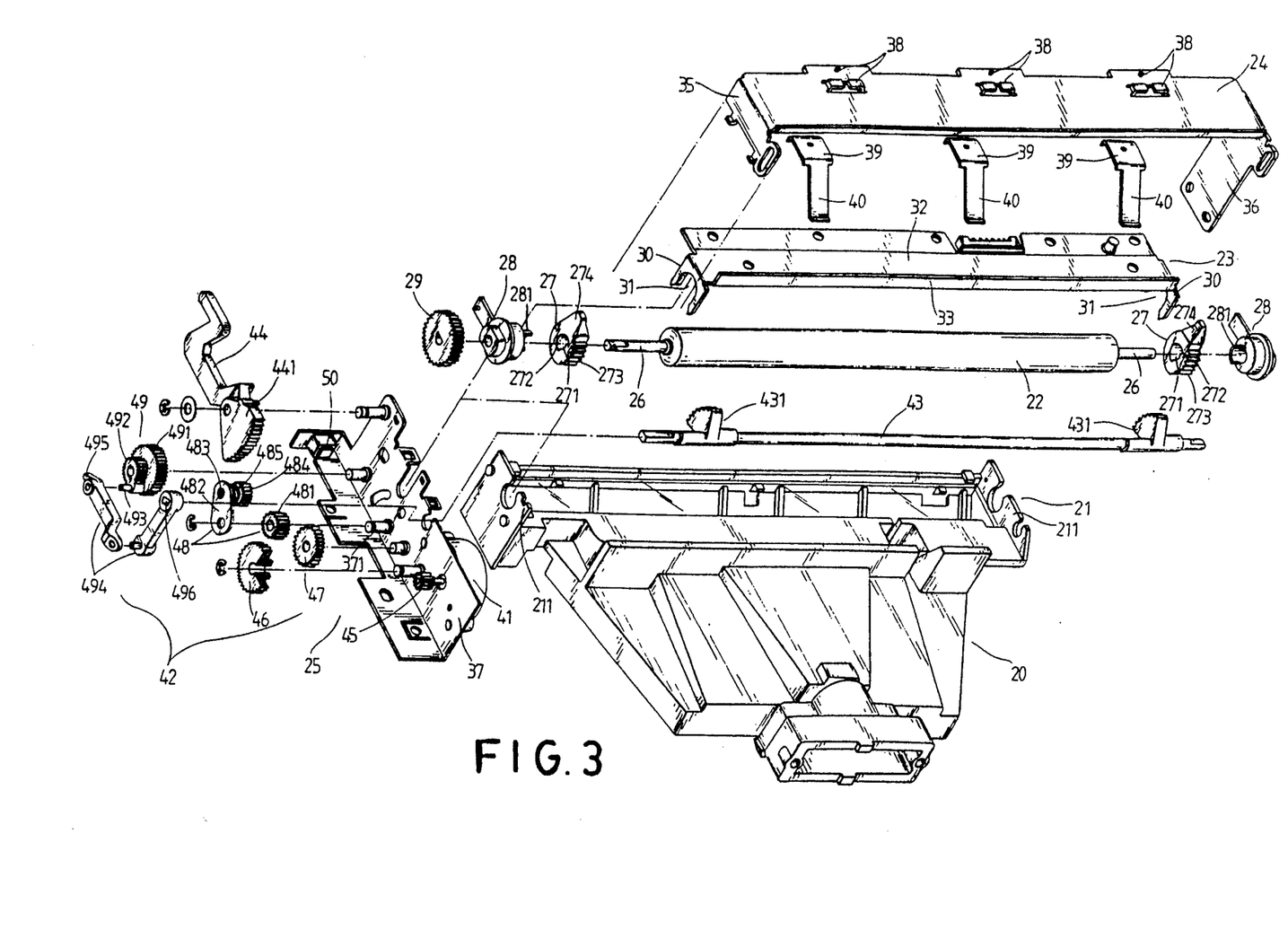
FIG. 3 shows an exploded view of a transmission mechanism of a fax machine according to the present invention.
Figure 4:
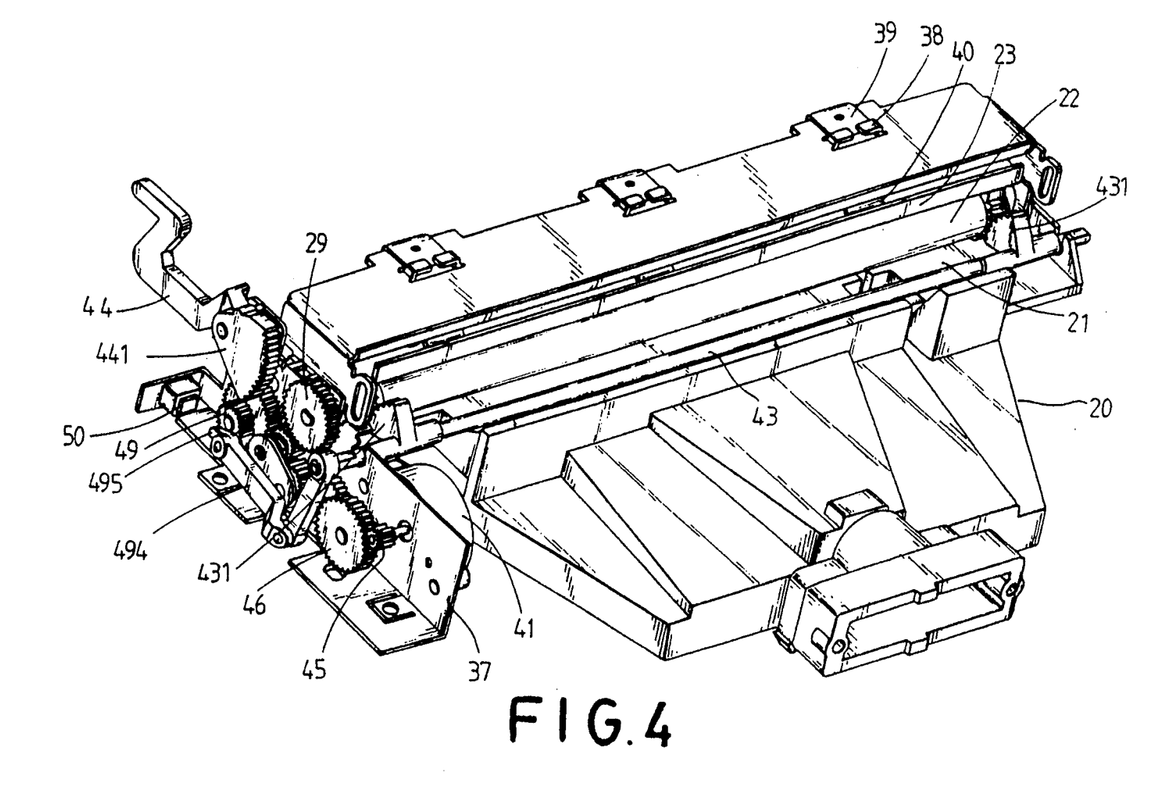
FIG. 4 shows an external three-dimensional view of an assembled transmission mechanism as shown in FIG. 4.

Referring to FIGS. 3 and 4, the fax machine of the present invention is shown comprising an optical reader 20 with a projection portion 21 having a roller 22 pivotally mounted thereto. The roller 22 is provided with a beat sensitive head 23 for printing, which is in turn pressed upon flexibly by a heat sensitive head press piece 24. A transmission device 25 is appropriately arranged, in conjunction with the above-mentioned components, as a means to actuate the rising and the descending motions of both roller 22 and heat sensitive head 23.

The roller 22 comprises at both ends thereof the rolling shafts 26, each of which is respectively provided with a pivotally mounted sustaining cam 27 and an end support 28 in that order. However, one of the rolling shafts 26 comprises at the end thereof a roller transmission gear 29. The sustaining cam 27 is composed of a pivotal hole 271 having therein a braking groove 272 with an appropriate rotating angle and of a toothed surface 273 located at the outer circumferential surface thereof. The end support 28 is provided with a restraining piece 281 capable of being inserted pivotally into the braking guide groove 272 in such a manner that the restraining piece 281 is permitted to rotate therein. The end supports 28 are inserted fixedly into the upper folded sides 211 of the projection portion 21.

The printing heat sensitive head 23 is composed of pivotal sides 30 located at both ends thereof and provided with an indentation 31 which permits the end support 28 to fit thereinto. The heat sensitive head 23 further comprises a top plate 32 having thereon a folded edge 33 which is located at the front side thereof and extends upwardly. In addition, the heat sensitive head 23 consists of a press piece 24 disposed thereover. Located at both ends off the press piece 24 are folded ends 35 and 36, which are fastened respectively to the device frame 37 of the transmission device 25 and to one end of the projection portion 21 of the optical reader 20. The press piece 24 further comprises a plurality of insertion portions 38 serving to receive therein respectively one end of the elastic press pieces 39 whose other end portions are constructed as elastic press ends 40, each of which is provided with a slight bending angle so as to be able to restrain flexibly the top plate 32 of the heat sensitive head 23, which in turn is used to press flexibly upon the roller 22. It must be noted that there is a substantial pressing room existing between the heat sensitive head 23 and the heat sensitive head press piece 24 described above.

Figure 5:
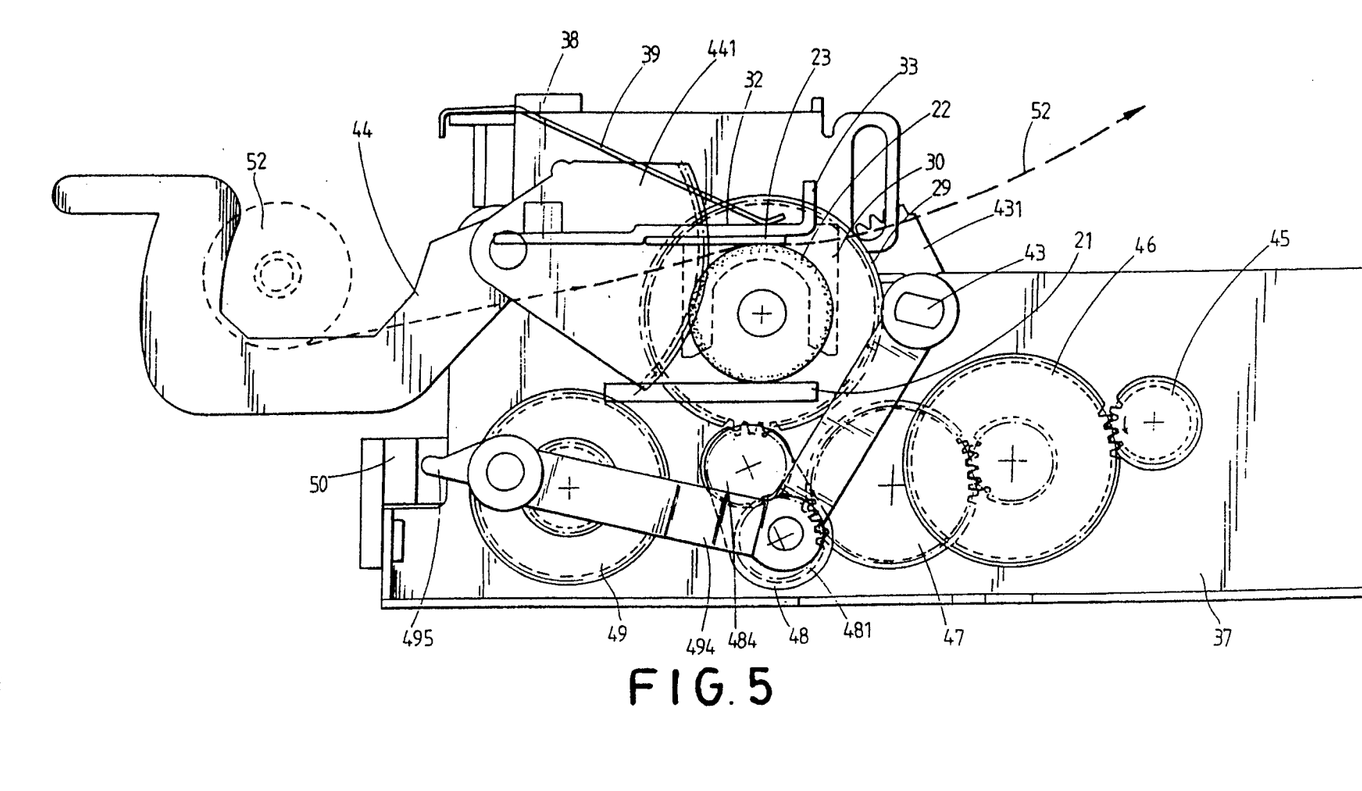
FIG. 5 shows a schematic view of a transmission mechanism at work during the process of receiving graphic information according to the present invention.
Figure 6:
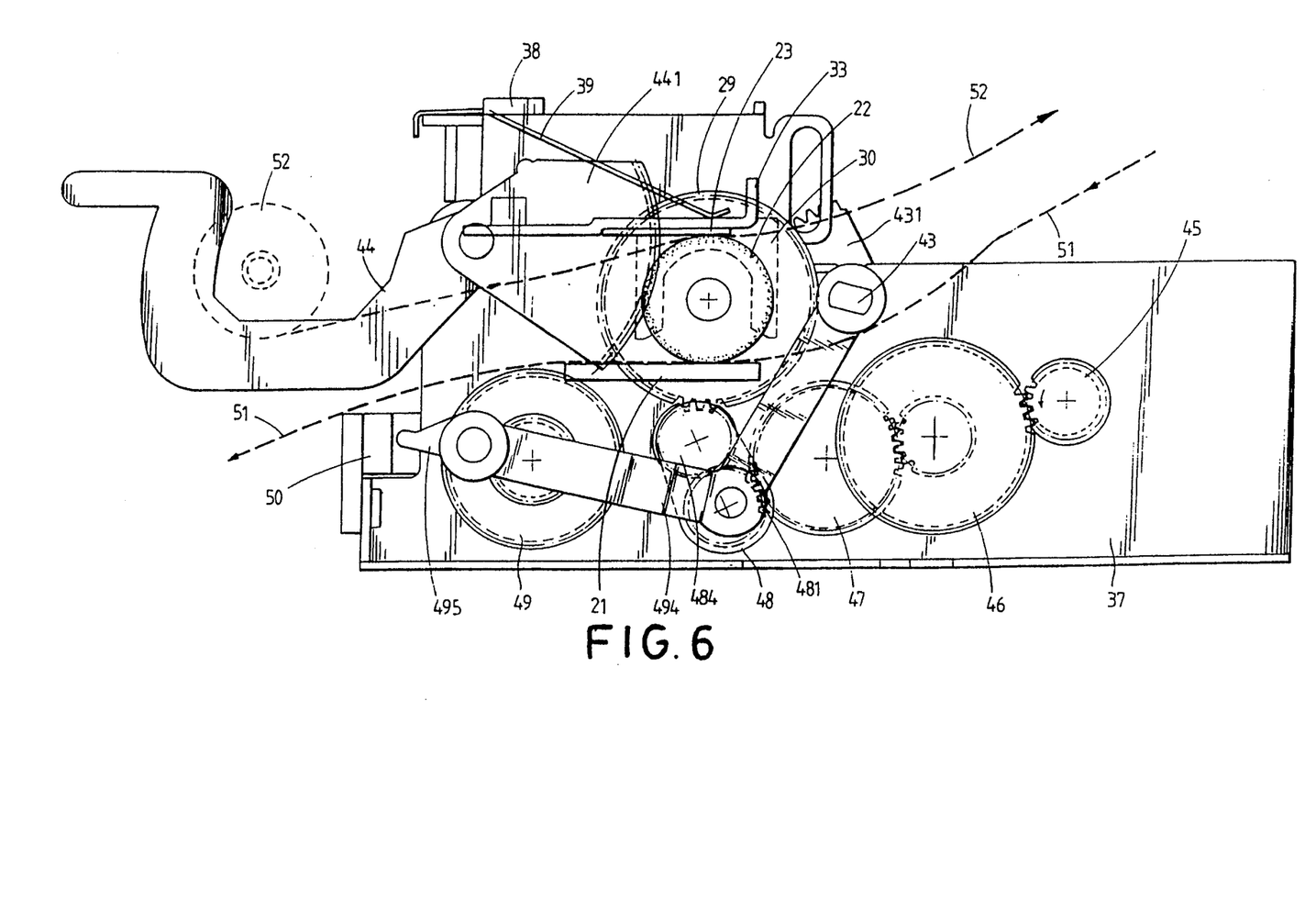
FIG. 6 shows a schematic view of a transmission mechanism at work during the process of reproducing graphic information received by the fax machine according to the present invention.

The transmission device 25 is mounted on the device frame 37 and is composed of a step-by-step motor 41, a drive gear set 42, a wrenching shaft 43, and a manually controlled press arm 44. Now referring to FIGS. 3–8, the step-by-step motor 41 serves to drive a steering clutch apparatus 48 by means of a steering shaft gear 45 and two idle wheels 46 and 47. The steering clutch apparatus 48 can be a planetary gear set and is provided with a main gear 481 pivotally arranged on the axle 371 of the device frame 37. In the meantime, the main gear 481 is coupled with one end of a steering piece 482 whose other end is provided with an axle 483 used to couple pivotally with a planetary gear 484. Located between the planetary gear 484 and the steering piece 482 is an urging spring 485, which is intended to confine the rotating effect of the planetary gear 484 relative to the steering piece 482. As a result, the steering clutch apparatus 48 can not rotate in relation to the steering piece 482 when the main gear 481 is driven to rotate by an external force. Therefore, both planetary gear 484 and steering piece 482 rotate in accordance with the steering direction of the main gear 481, as indicated by the arrow in FIG. 7. As soon as the planetary gear 484 has encountered with a resistance preventing it from rotating toward the direction in which the main gear 481 rotates, the planetary gear 484 must overcome the resistance so as to begin rotating. The roller transmission gear 29 is disposed at the location where the roller transmission gear 29 is capable of stopping the planetary gear 484 by contact while the connection rod gear 49 is arranged at another location corresponding to the location where the roller transmission gear 29 is disposed. The connection rod gear 49 is composed of a gear layer 491 capable of making contact with the planetary gear 484 and of another gear layer 492 capable of being driven to rotate by the sector gear plate 441 of the manually controlled press arm 44. The gear layer 492 further comprises a pivotal shaft 493 located at the outer side thereof and intended to couple pivotally with one end of a toggle connection lever 494, which is provided with an induction foot 495 capable of inducing the proximity switch 50 as shown in FIGS. 5 and 6. The other end of the toggle connection lever 494 is provided with a through hole 496 serving to receive therein one end of the wrenching shaft 43. Both ends of the wrenching shaft 43 are further provided with wrenching sector gear plate 431 located at the positions corresponding to the positions of two sustaining cams 27 so that the outer toothed surface 273 of the sustaining cam 27 engages the wrenching sector gear plate 431. As a result, the sustaining cam 27 can be driven to rotate when the wrenching shaft 43 begins rotating.

Figure 7:
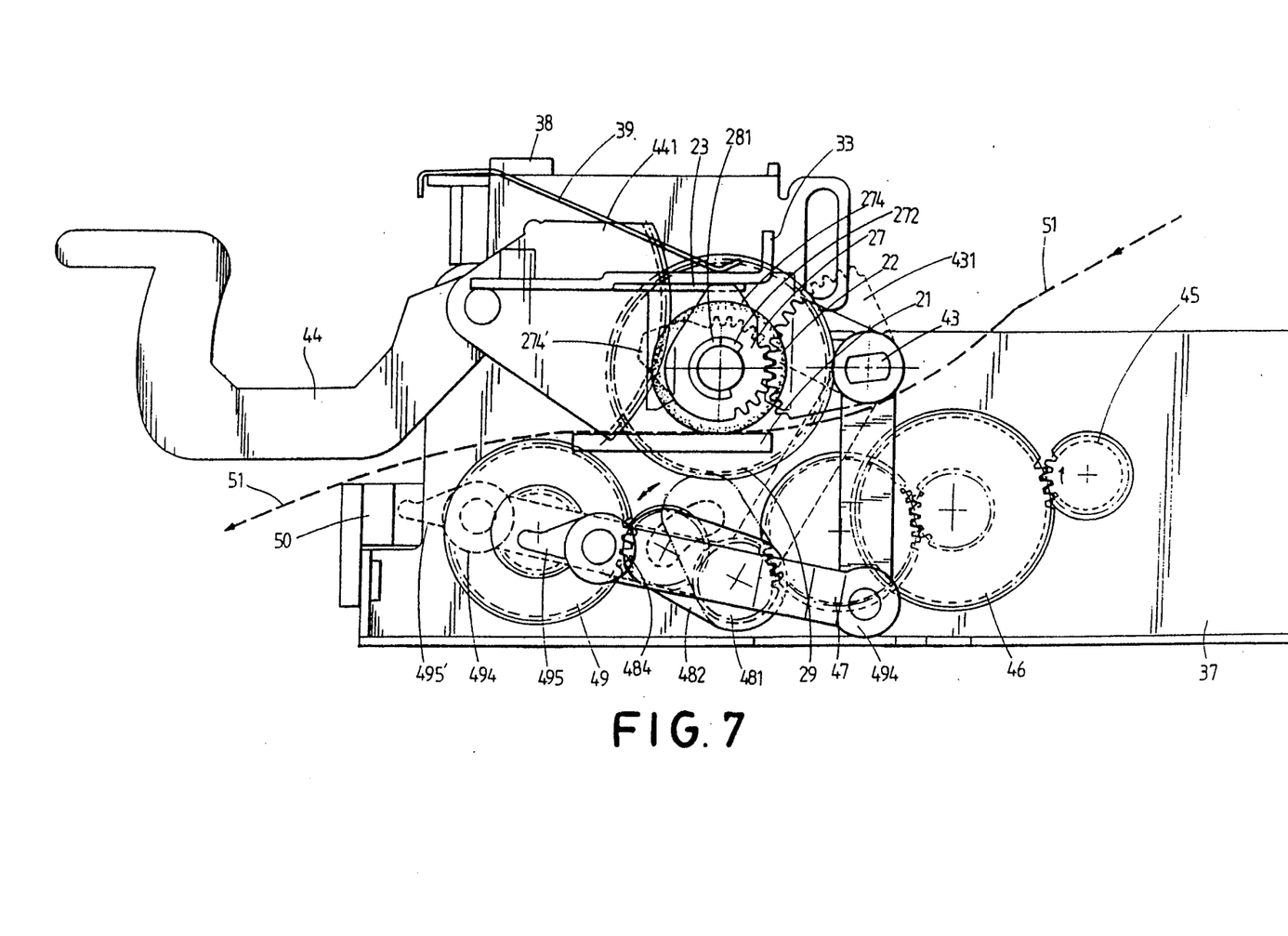
FIG. 7 shows a schematic view of a transmission mechanism at work during the process of transmitting graphic information according to the present invention.

As shown in FIGS. 5 and 6, as soon as the fax machine has received graphic information, step-by-step motor 41 actuates the steering clutch apparatus 48 to rotate by means of idle wheels 46 and 47, thereby causing the planetary gear 484 to deflect in order to engage with the roller transmission gear 29 to drive the roller 22 to roll the information paper 51 or the heat sensitive paper 52 to pass through the projection portion 21 or the heat sensitive head 23 so as to bring about the operations of receiving and reproducing the graphic information. As soon as the fax machine has received a signal to transmit the graphic information, as shown in FIG. 7, the step-by-step motor 41 is instructed by the built-in programmed control to actuate the planetary gear 484 of the steering clutch apparatus 48 to deflect in order to engage with the connection rod gear 49, which in turn makes the toggle connection lever 494 travel from the vicinity of the proximity switch 50 to the rear dead point of the connection rod gear 49. At this moment, the wrenching shaft 43 is actuated by the toggle connection lever 494 to rotate for an appropriate angle, with the sector gear 431 thereof being rotated accordingly for the same angle. Therefore, the sector gear 431 engages with the sustaining cam 27 to cause the protruded portion 274 of the sustaining cam 27 to urge gradually the heat sensitive head 23 toward the heat sensitive head press piece 24 and to form with the roller 22 a substantial clearance. As soon as the step-by-step motor 41 has completed the job of moving the toggle connection lever 494 to the rear dead point of the connection rod gear 49, the step-by-step motor 41 reverses itself so as to drive the steering clutch apparatus 48 to engage with the roller transmission gear 29, thereby making the roller 22 roll the information paper 51 to pass through the projection portion 21. Thereafter, the built-in programmed control mechanism instructs the motor 41 to reverse itself, thereby resulting in the planetary gear 484 engaging again with the connection rod gear 49 so as to bring the toggle connection lever 494 back to the position of the front dead point of the connection rod gear 49. In the meantime, the induction foot 495 located at the front end of the toggle connection lever 494 initiates the proximity switch 50, which in turn actuates the motor 41 to rotate in a reverse direction so as to activate the steering clutch apparatus 48 to engage with the roller transmission gear 29 to complete the operation of transmitting the graphic information. If the toggle connection lever 494 reverses itself to move to the front dead point, the toggle connection lever 494 will once again actuate the wrenching shaft 43 to rotate in a reverse direction so as to allow the sector gear 431 to initiate the sustaining cam 27 to rotate in reverse in order to relieve the heat sensitive head 23 of an urging force. As a result, the heat sensitive head 23 moves back to press on the heat sensitive paper 52 and the roller 22 by virtue of the pressing force of elastic press piece 39 exerting on the heat sensitive head 23.

Figure 8:
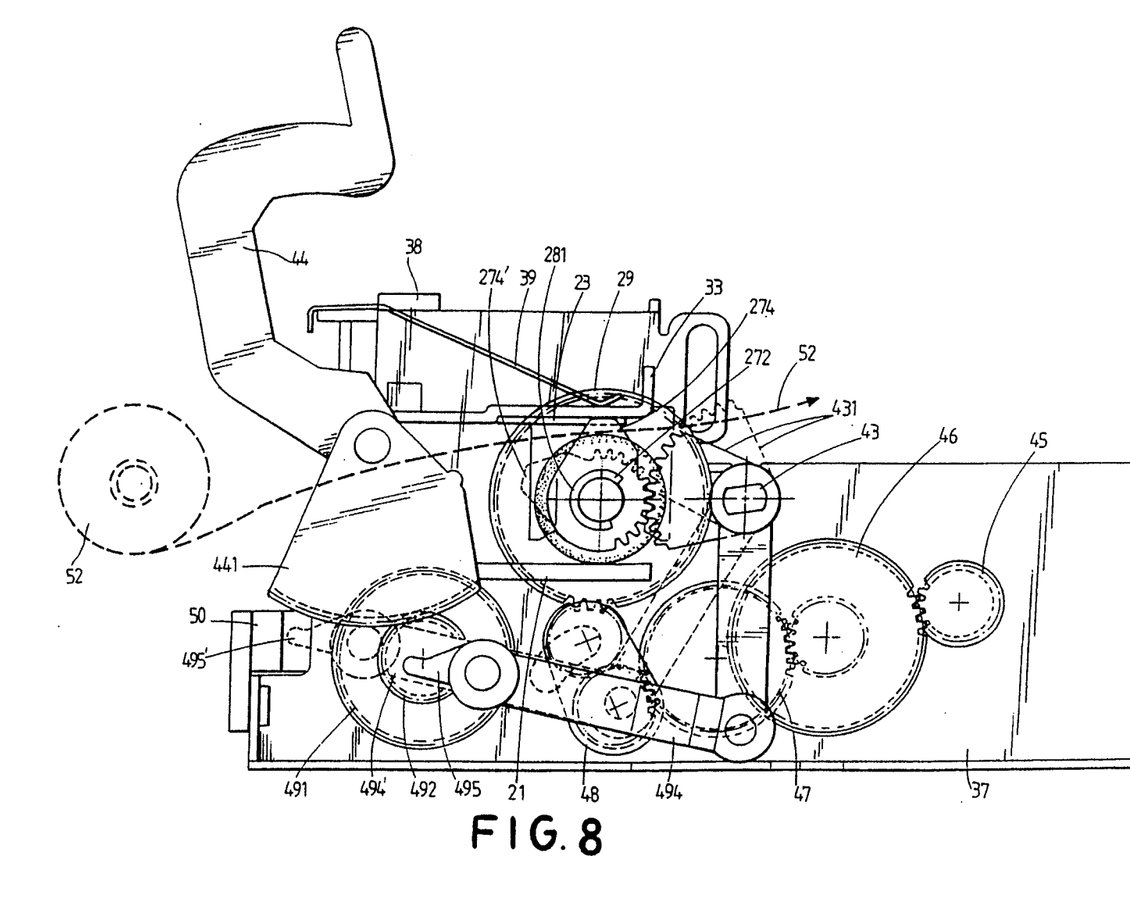
FIG. 8 shows a schematic view of a transmission mechanism at work during the process of installing heat sensitive paper according to the present invention.

If the user of the fax machine of the present invention wants to replenish the heat sensitive paper 52, he or she may manipulate the manually controlled press arm 44 as shown in FIG. 8 to allow its sector gear plate 441 to move downwardly to engage with the gear layer 492 of the connection rod gear 49. The toggle connection lever 494 can be also actuated by a simple action of twisting the press arm 44 so as to cause the sustaining cam 27 to urge the heat sensitive head 23 away from the roller 22. Thereafter, the end edge of the heat sensitive paper 52 can be inserted through the clearance between the heat sensitive head 23 and the roller 22. Now the user may pull the press arm 44 in a reverse direction to permit the toggle connection lever 494 to return to its original position. The sustaining cam 27 is also made to relieve the heat sensitive head 23 of an urging force so that the heat sensitive head 23 is able to hold securely the newly replenished heat sensitive paper 52, along with the roller 22.

As mentioned previously, a conventional fax machine of the prior art makes use of transmission and receiving mechanisms involving two rollers and two motors or two rollers actuated by one motor. On the other hand, the transmission and receiving mechanism of the fax machine of the present invention is ingeniously simplified to the extent that it consists of only one roller and one motor to carry out the operations of transmitting, receiving, and reproducing the graphic information. Therefore, the present invention is a technological breakthrough, which results in a substantial reduction in the cost per unit of making the fax machine.

What I claim is:

1. A fax machine comprising:
   an optical reader,
   a roller,
   a heat sensitive head for printing,
   a heat sensitive head press piece, and
   a mechanical transmission mechanism,
   said roller being pivotally arranged at one side of a projection portion of said optical reader,
   said heat sensitive head being pivotally disposed at one side of said roller, said heat sensitive head being pressed upon by said heat sensitive head press piece,
   said mechanical transmission mechanism including a heat sensitive head urging means for initiating a compressional disassociation of said heat sensitive head and said roller when said fax machine has received a transmitting signal.

2. A fax machine according to claim 1, wherein said roller comprises at both ends thereof roller shafts, one of said roller shafts provided thereon with a sustaining cam and an end support while another of said roller shafts provided thereon with a sustaining cam, an end support, and a roller transmission gear.

3. A fax machine according to claim 2, wherein said sustaining cam is composed of a pivotal hole having therein a braking guide groove with an appropriate swing angle, and of a protruded portion and a non-protruded portion along an external circumferential surface thereof, with said non-protruded portion being provided thereon with a toothed surface; wherein said end support comprises a restraining piece, which is positioned in such a manner that said restraining piece can be pivotally inserted into said braking guide groove; and wherein said end support is fixedly embedded in both ends of said projection portion.

4. A fax machine according to claim 1, wherein said heat sensitive head comprises at both ends thereof pivotal sides, which are provided with folded sides having therein indentations, wherein said heat sensitive head further comprises a top plate having thereon a folded edge which is disposed at a front edge thereof and extends upwardly, said top plate being flexibly pressed upon by said heat sensitive head press piece so as to permit said heat sensitive head to press flexibly on said roller.

5. A fax machine according to claim 4, wherein said heat sensitive head press piece is fastened to a device frame of said mechanical transmission mechanism and to said one side of said projection portion of said optical reader by folded ends thereof, said heat sensitive head and said press piece containing therebetween a plurality of elastic members.

6. A fax machine according to claim 5, wherein said top plate of said heat sensitive head press piece comprises thereon a plurality of insertion portions to receive therein a plurality of elastic press pieces, each of which is fastened at one end thereof to said insertion portion and is provided with a slight bending angle at another end thereof which presses flexibly on said top plate of said heat sensitive head.

7. A fax machine according to claim 1, wherein said mechanical transmission mechanism includes a device frame which is provided thereon with a motor, a transmission gear set, a wrenching shaft, and a manually controlled press arm, said motor comprising a steering shaft gear which imparts a driving force of said motor to a steering clutch apparatus through a plurality of idle wheels.

8. A fax machine according to claim 7, wherein said steering clutch apparatus is pivotally mounted on said device frame by a main gear which is coupled at one end thereof with a steering piece and at another end thereof with a planetary gear by an axle thereof, said planetary gear and said steering piece containing therebetween an urging spring, said main gear being actuated by said plurality of idle wheels and said steering shaft gear of said motor, said planetary gear engaging with said main gear to deflect in dual directions so as to engage respectively with said roller transmission gear and said connection rod gear.

9. A fax machine according to claim 7, wherein a connection rod gear is provided with multiple layers of gears, one of said multiple layers of gears is to engage with the steering clutch apparatus while another of said multiple layers of gears is to engage with the manually controlled press arm and is further provided with a pivotal shaft fastening pivotally connected with a toggle connection lever.

10. A fax machine according to claim 8, wherein said connection rod gear is provided with multiple layers of gears, one of said multiple layers of gears is to engage with the steering clutch apparatus while another of said multiple layers of gears is to engage with the manually controlled press arm and is further provided with a pivotal shaft fastening pivotally connected with a toggle connection lever.

11. A fax machine according to claim 9, wherein said manually controlled press arm comprises at one end thereof a hooked arm and at another end thereof a sector gear plate, said press arm engaging with one gear layer of said connection rod gear when said hooked arm of said press arm is twisted at an angle.

12. A fax machine according to claim 10, wherein said manually controlled press arm comprises at one end thereof a hooked arm and at another end thereof a sector gear plate, said press arm engaging with one gear layer of said connection rod gear when said hooked arm of said press arm is twisted at an angle.

13. A fax machine according to claim 7, wherein a toggle connection lever is made up of two connection rods pivotally fastened together, with one end of said toggle connection lever being pivotally fastened with a connection rod gear and being provided with a proximity induction foot to induce a proximity switch located in front of said connection rod gear, with another end of said toggle connection lever being provided with a through hole to receive therein one end of said wrenching shaft.

14. A fax machine according to claim 7, wherein said wrenching shaft is pivotally mounted on one side of said roller and is composed of sector gear plates positioned correspondingly to two sustaining cams pivotally fastened to both ends of said roller, said sector gear plates of said wrenching shaft engaging with an externally toothed surface of said sustaining cans.

15. A fax machine according to claim 13, wherein said wrenching shaft is pivotally mounted on one side of said roller and is composed of sector gear plates positioned correspondingly to two sustaining cams pivotally fastened to both ends of said roller, said sector gear plates of said wrenching shaft engaging with an externally toothed surface of said sustaining cams.

* * * * *